(12) United States Patent
Wurmfeld

(10) Patent No.: US 10,236,582 B1
(45) Date of Patent: *Mar. 19, 2019

(54) SYSTEMS AND METHODS FOR PROVIDING VIBRATION TRANSDUCTION AND RADIO-FREQUENCY COMMUNICATION IN PROXIMITY TO AN ELECTRICALLY CONDUCTIVE STRUCTURE

(71) Applicant: Capital One Services, LLC, McLean, VA (US)

(72) Inventor: David Wurmfeld, Fairfax, VA (US)

(73) Assignee: Capital One Services, LLC, McLean, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/938,828

(22) Filed: Mar. 28, 2018

(51) Int. Cl.
*H01Q 7/06* (2006.01)
*G06F 3/01* (2006.01)
*G08B 6/00* (2006.01)

(52) U.S. Cl.
CPC ............ *H01Q 7/06* (2013.01); *G06F 3/016* (2013.01); *G08B 6/00* (2013.01)

(58) Field of Classification Search
CPC . H01Q 7/00; H01Q 7/06; G06F 3/016; G08B 6/00
See application file for complete search history.

(56) References Cited

U.S. PATENT DOCUMENTS

| | | | |
|---|---|---|---|
| 6,603,080 B2 | 8/2003 | Jensen | |
| 6,744,367 B1* | 6/2004 | Forster | G06K 19/0675 |
| | | | 310/313 R |
| 2008/0179403 A1 | 7/2008 | Endlebardt et al. | |
| 2010/0243732 A1 | 9/2010 | Wallner | |
| 2013/0087614 A1 | 4/2013 | Limtao et al. | |
| 2015/0255871 A1* | 9/2015 | Baringer | A61B 5/0002 |
| | | | 343/702 |
| 2017/0214132 A1* | 7/2017 | Jeon | G06Q 20/3278 |

FOREIGN PATENT DOCUMENTS

WO    WO 92/20048 A1    11/1992

* cited by examiner

*Primary Examiner* — Robert Karacsony
(74) *Attorney, Agent, or Firm* — Finnegan, Henderson Farabow, Garrett & Dunner, LLP

(57) ABSTRACT

Systems and methods are provided for providing vibration transduction and radio-frequency communication in proximity to an electrically conductive structure. The system may comprise an antenna element, an electrically conductive structure in proximity to the antenna element, and a vibration transducer comprising a material. The material may comprise a ferromagnetic material with piezoelectric properties. The vibration transducer may be positioned between the antenna element and the conductive structure.

19 Claims, 9 Drawing Sheets

SYSTEMS AND METHODS FOR PROVIDING VIBRATION TRANSDUCTION AND RADIO-FREQUENCY COMMUNICATION IN PROXIMITY TO AN ELECTRICALLY CONDUCTIVE STRUCTURE

TECHNICAL FIELD

The present disclosure provides systems and methods for providing vibration transduction and radio-frequency communication. In particular, in some embodiments, the vibration transduction and radio-frequency communication may be effectuated in proximity to an electrically conductive structure.

BACKGROUND

The continued miniaturization of electronic devices requires product designers to contend with increasingly demanding design constraints and design requirements. Devices are expected to take up less room while providing more functionality. More functionality, however, typically requires more components in the devices, making fulfillment of size requirements more difficult.

One feature that may be desired in electronic devices is radio-frequency (RF) communication. Devices capable of RF communication generally have antennas or similar components for transmitting and/or receiving electric, magnetic, and/or electromagnetic signals. In a small device, one or more antennas may need to be positioned near, or in proximity to, one or more electrically conductive structures. Such structures may be power or ground planes on a printed circuit board or a metallic layers or chassis to provide structural support to the device (e.g., rigidity). The conductive structure may be a substantially flat surface. Positioning conductive structures near antennas, however, may interfere with the ability of the antenna to transmit and/or receive RF signals.

Another functionality that may be desired in electronic devices is to provide user-perceived output signals (e.g., haptic and/or auditory outputs) to a device user. Similarly, the ability to receive tactile or auditory input (e.g., a button press or a voice command) is another functionality that may be desired in an electronic device. Including components to provide these capabilities in a device, however, may require increasing the size of the device. For example, a button for press inputs or a speaker for auditory output may take up significant surface area and volume in a device.

In view of the shortcomings of current systems and methods for providing vibration transduction and radio-frequency communication in proximity to an electrically conductive structure, improved systems and methods for providing the same are desired.

SUMMARY

Consistent with disclosed embodiments, a system providing vibration transduction and radio-frequency communication in proximity to an electrically conductive structure may comprise an antenna element; an electrically conductive structure in proximity to the antenna element; and a vibration transducer comprising a first material, the first material comprising a ferromagnetic material with piezoelectric properties, wherein the vibration transducer may be positioned between the antenna element and the conductive structure.

Consistent with disclosed embodiments, a system providing vibration transduction and radio-frequency communication in proximity to an electrically conductive structure may comprise an antenna element comprising an inductor; an electrically conductive structure in proximity to the inductor; and a vibration transducer comprising a ferromagnetic material with piezoelectric properties, wherein the vibration transducer may be positioned adjacent to the inductor and between the inductor and the conductive structure.

Consistent with disclosed embodiments, a system providing vibration transduction and radio-frequency communication in proximity to an electrically conductive structure may comprise an antenna element; an electrically conductive structure in proximity to the antenna element; and a vibration transducer comprising a ferromagnetic material with piezoelectric properties, wherein the vibration transducer may be positioned between the inductor and the conductive structure, the vibration transducer provides at least one of haptic or auditory output signals, and the vibration transducer converts at least one of a tactile or auditory input into an electrical signal.

Consistent with disclosed embodiments, a method for using radio-frequency communication to initiate vibration transduction in proximity to an electrically conductive structure may comprise transmitting a radio-frequency signal to an antenna element that is in proximity to an electrically conductive structure within a system and initiating, with the radio-frequency signal, vibration transduction by a vibration transducer positioned between the antenna element and the conductive structure, the vibration transducer comprising a first material that comprises a ferromagnetic material with piezoelectric properties.

Consistent with disclosed embodiments, a method for using radio-frequency communication to initiate vibration transduction in proximity to an electrically conductive structure may comprise transmitting a radio-frequency signal to an antenna element comprising an inductor, the inductor being in proximity to an electrically conductive structure within a system, and initiating, with the radio-frequency signal, vibration transduction by a vibration transducer adjacent to the inductor and between the inductor and the conductive structure, the vibration transducer comprising a ferromagnetic material with piezoelectric properties.

Consistent with disclosed embodiments, a method for using radio-frequency communication to initiate vibration transduction in proximity to an electrically conductive structure may comprise transmitting a radio-frequency signal to an antenna element that is in proximity to an electrically conductive structure within a system, and initiating, with the radio-frequency signal, vibration transduction by a vibration transducer comprising a ferromagnetic material with piezoelectric properties, wherein the vibration transducer is positioned between the antenna and the conductive structure, the vibration transducer provides at least one of haptic or auditory output signals, and the vibration transducer converts at least one of a tactile or auditory input into an electrical signal.

The foregoing general description and the following detailed description are exemplary and explanatory only and are not restrictive of the claims.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DESCRIPTION OF THE EMBODIMENTS

As described in further detail herein, the disclosed embodiments are directed to systems and methods for providing vibration transduction and radio-frequency communication in proximity to an electrically conductive structure. In this context, transduction may be defined as the conversion of energy or a signal from one form to another. Vibration transduction may involve generating a user-perceived output signal and/or receiving physical and voice-command inputs from a user.

In some embodiments, the vibration transduction and radio-frequency communication may be provided within a small, portable user device, such as, for example, a mobile phone, an MP3 player, a portable personal computer, an identification device, a payment device, a digital watch, a fitness-tracking device, or another type of device. The device may be capable of receiving voice commands and of transmitting and/or receiving RF signals from other devices, providing haptic or auditory notification to a device user, and/or receiving tactile input from the user (e.g., a button press, a switch activation, or a touch input).

A user device may comprise an electrically conductive structure in proximity to an antenna or an antenna element within or exterior to the device. For example, the conductive structure may be within 5 or 10 millimeters of an antenna element. The conductive structure may be a metal plate, metal chassis, ground plane on a printed circuit board, or power plane on a printed circuit board.

To prevent the conductive structure from interfering with transmission and reception by the antenna, a ferromagnetic material may be positioned between the antenna and the conductive structure. Such material may be a ferromagnetic material with piezoelectric properties, which may both prevent interference and provide user-perceivable output capabilities. Using a single component for these two functions may require less area or volume in the device than using multiple components.

Reference will now be made in detail to exemplary embodiments, examples of which are illustrated in the accompanying drawings and disclosed herein. Wherever convenient, the same reference numbers will be used throughout the drawings to refer to the same or like parts.

Figure 1:
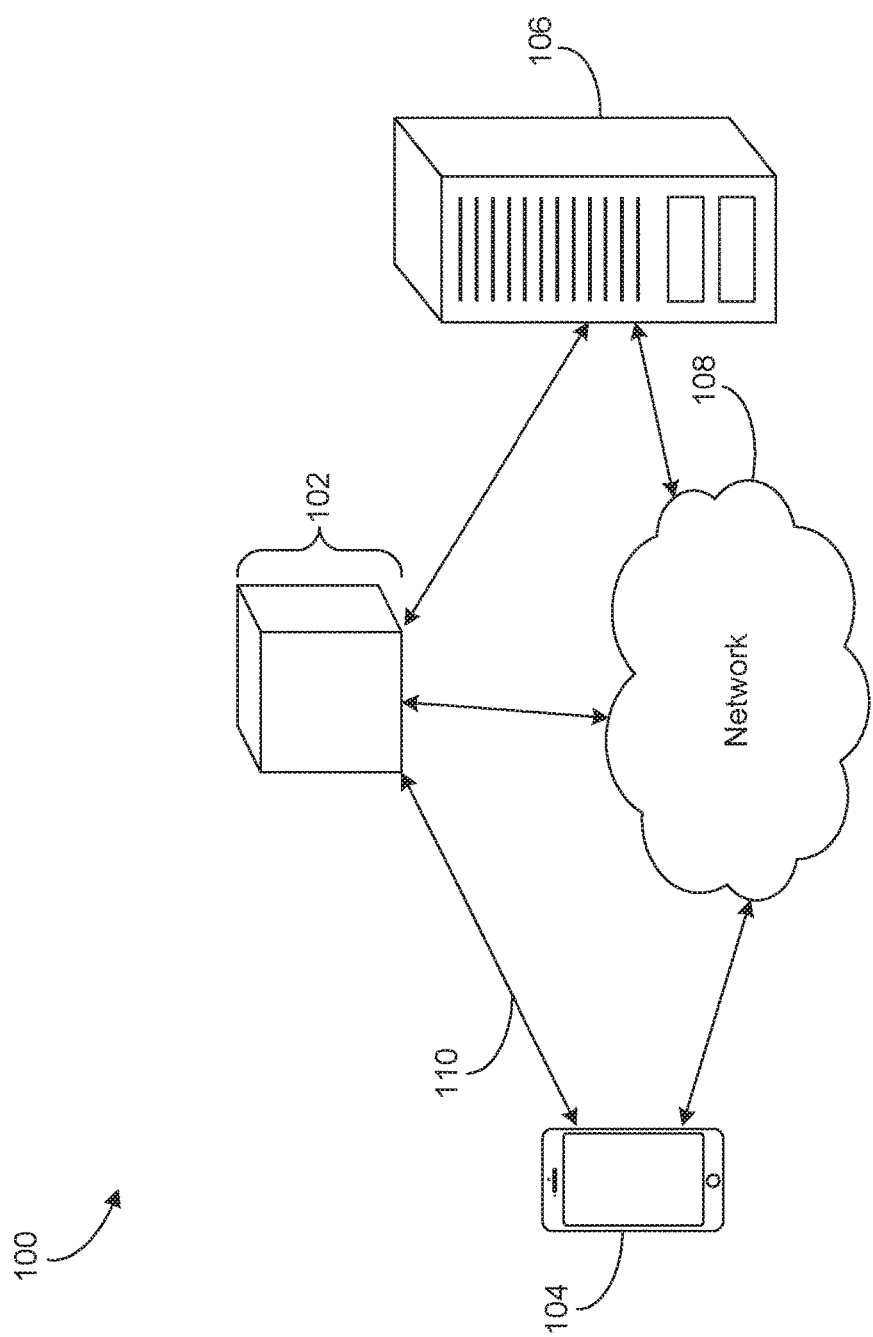
FIG. 1 is a diagram of a system environment within which an exemplary system for providing vibration transduction and radio-frequency communication in proximity to an electrically conductive structure may operate.

FIG. 1 is a diagram of an exemplary system environment 100 within which an exemplary user device 102 may operate. User device 102 may provide vibration transduction and radio-frequency communication in proximity to an electrically conductive structure, and may be, for example, a mobile phone, an MP3 player, a portable personal computer, an identification device, a payment device, a digital watch, a fitness tracking device, another type of device, or a combination of these devices.

User device 102 may be capable of communicating with another device similar to user device 102 or another type of device. For example, user device 102 may communicate with an external smartphone 104, a server 106, or other computing system. Inter-device communication may be effectuated using Radio-frequency Identification (RFID), Bluetooth, Near-Field Communication (NFC), WiFi Direct, or other communication technologies. Another device may initiate vibration transduction in user device 102 by transmitting a signal that causes user device 102 to generate one or more electrical output signals that are transduced into haptic or auditory output signals.

User device 102 may include technologies, such as various hardware and software components, to transmit and receive RF signals. In the case of a mobile phone, user device 102 may transmit voice or other data to nearby cell towers. In the case of an MP3 player, user device 102 may receive MP3 files from a user's personal computer. In the case of a payment device, user device 102 may transmit or receive payment information to another payment device. In the case of a digital watch, user device 102 may receive time zone information from a user's mobile phone with Global Position System capabilities.

User device 102 may be able to transmit or receive data over network 108. Network 108 may be implemented as, for example, the Internet, a wired Wide Area Network (WAN), a wired Local Area Network (LAN), a wireless LAN (e.g., Institute of Electrical and Electronics Engineers (IEEE) 802.11, Bluetooth, etc.), a wireless WAN (e.g., Worldwide Interoperability for Microwave Access (WiMAX)), a public switched telephone network (PSTN), an Integrated Services Digital Network (ISDN), an infrared (IR) link, a radio link, such as a Universal Mobile Telecommunications System (UMTS), Global System for Mobile Communications (GSM), Code Division Multiple Access (CDMA), broadcast radio network, cable television network, a satellite link, or the like. Network 108, in some embodiments, may comprise a plurality of interconnected wired or wireless data networks that receive data from one device (e.g., user device 102) and send it to another device (e.g., smartphone 104).

User device 102 may provide notifications and alerts and may receive inputs to allow a user to interact with user device 102. For example, a user may turn user device 102 on or off by applying pressure to it or by issuing voice commands to user device 102. In some embodiments, a user may use another device, such as smartphone 104, to interact with user device 102.

In some embodiments, a user may choose an authentication process for using user device 102. For example, a user may select a multiple-layer authentication process, such as biometric-data authentication, in-person authentication, personal identification number, mobile-device identification, and/or credit- or debit-card swipe to gain access to and use user device 102.

Components in system environment 100 may communicate bi-directionally with other components in system environment 100 either through network 108 or through one or more direct communication links, such as a wireless communication link 110 between user device 102 and smartphone 104. In some embodiments, wireless communication link 110 may include a direct communication network, including, for example, Bluetooth, Wi-Fi, NFC, or other suitable communication methods that provide a medium for transmitting data between separate devices.

For ease of discussion, FIG. 1 depicts only particular components being connected to network 108. In some embodiments, however, more or fewer components may be connected to network 108.

Figure 2:
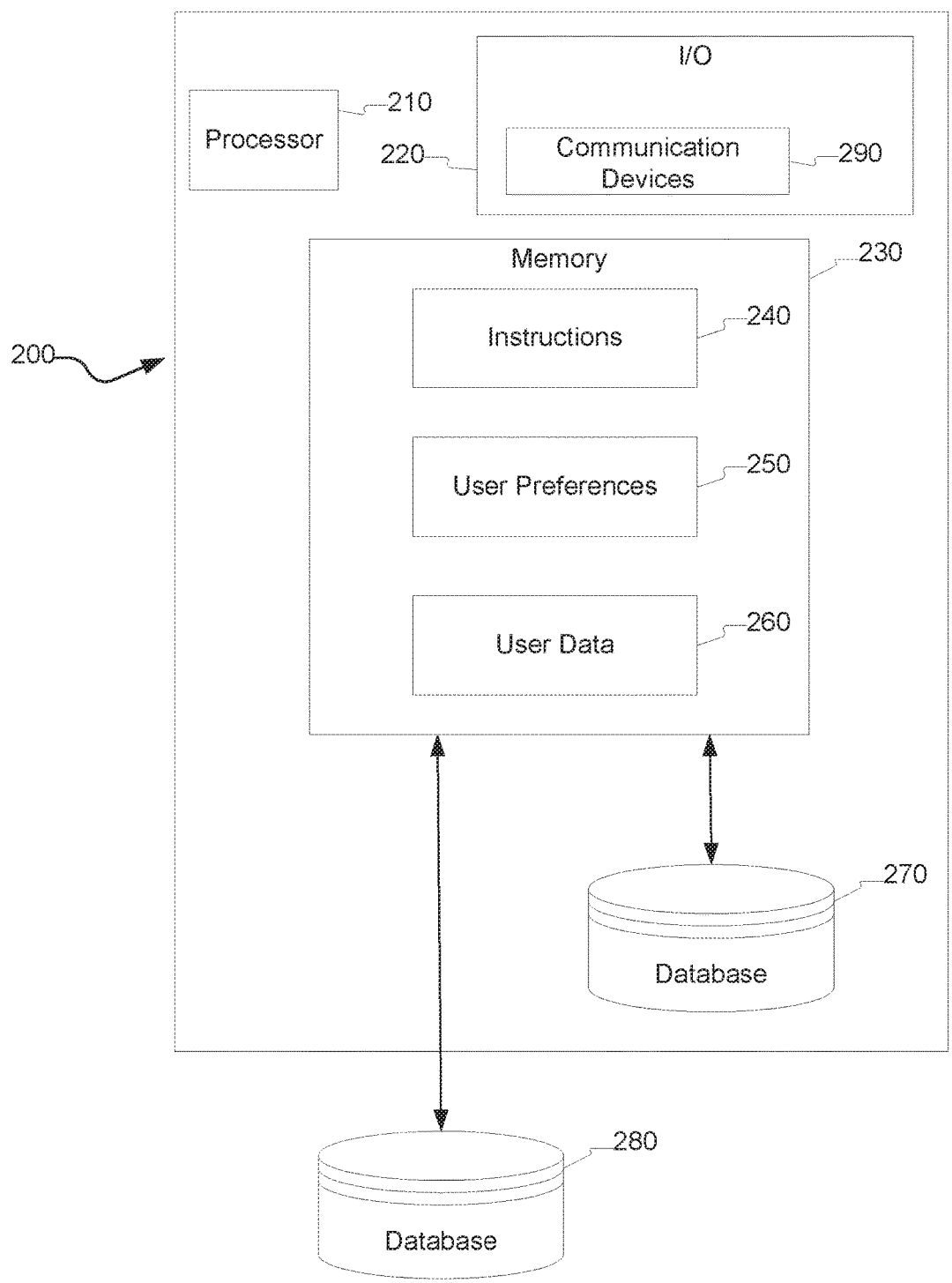
FIG. 2 is a diagram of an exemplary computing system configuration that may, in some embodiments, implement the system of FIG. 1.

FIG. 2 is a diagram of an exemplary computing system configuration 200 that may, in some embodiments, implement user device 102 described above with respect to FIG. 1. In some embodiments, computing system 200 may include one or more processors 210, one or more I/O components 220, and one or more memories 230. Computing system 200 may be standalone, or may be part of a subsystem, which may be part of a larger system. Computing system 200 may include an internal database 270 and/or be in communication with an external database 280.

Processor 210 may constitute a single-core or multiple-core (e.g., dual or quad core) processor that may execute parallel processes simultaneously. For example, processor 210 may be configured with virtual processing technologies such as logical processors or other known technologies to simultaneously execute, control, run, manipulate, store, etc., multiple software processes, applications, programs, etc. One of ordinary skill in the art would understand that other types of processor arrangements could be implemented that provide for the capabilities disclosed herein. In some embodiments, processor 210 may be a microcontroller.

I/O components 220 may provide interfaces to one or more input devices, such as keyboards, mouse devices, and the like, which may enable computing system 200 to receive input from an operator of user device 102. I/O components 220 may comprise touch sensors, dome switches, or piezo-electric sensors. I/O components 220 may further include one or more displays, such as individual LEDs, LED arrays, liquid crystal displays, dot matrix displays, or other types of displays. I/O devices 220 may also comprise one or more communication devices 290 configured to receive and/or transmit data at and from computing system 200. Communication devices 290 may include one or more digital and/or analog communication devices that allow computing system 200 to communicate with other machines and devices, such as other components of system environment 100 shown in FIG. 1. For example, in some embodiments, communication devices 290 may comprise network adapters providing communication with network 108 (FIG. 1). In some embodiments, communication devices 290 may comprise wireless communication devices providing a direct communication link 110 (FIG. 1).

In some embodiments, communication devices 290 may be configured to receive user preferences 250 from smartphone 104, and real-time information from smartphone 104 and/or server 106 (FIG. 1). In some embodiments, such real-time information may include location information of smartphone 104, weather information, traffic information, map data, social-networking data, crime reports, news, air-traffic-control data, police data, medical-emergency data, and fire-service data. In some embodiments, real-time information may also include data captured by a sensor on smartphone 104, such as images, video, biometric authentication data (for example, finger print scan data and facial scan data), temperature data, speed data, and wind speed data. I/O device 220 may permit this real-time information to be captured on user device 102 using, for example, one or more sensors.

Memory 230 may include one or more storage devices configured to store software instructions 240, which, when executed by processor 210, cause processor 210 to perform operations consistent with the disclosed embodiments. The disclosed embodiments are not limited to separate programs or computers configured to perform dedicated tasks. Processor 210 may execute one or more instructions located remotely from computing system 200. For example, processor 210 may further execute one or more instructions located in database 270 and/or 280 or a cloud server (e.g., server 106 in FIG. 1) located outside of computing system 200. The instructions may comprise server applications, an authentication application, network communication processes, and other types of application or software. Memory 230 may be a volatile or non-volatile, magnetic, semiconductor, tape, optical, removable, non-removable, or other type of storage device or tangible (i.e., non-transitory) computer-readable medium.

Processor 210 may execute instructions 240 to analyze user preferences 250 and user data 260 to perform operations consistent with disclosed embodiments. User preferences 250 may be entered by the user. User preferences 250 may include information related to logistics of the operation of user device 102, such as auto-shutdown settings and vibration intensity. Memory 230 may also include user data 260. User data 260 may include a user's MP3 files, photographs, financial account information, username and password, home or work locations, credit or debit card PIN, biometric information, credit scores, financial transaction history, retail transaction history, user location data for past financial or retail transactions, financial-data breach alerts, birthdate, or fitness-tracking data. In some embodiments, computing system 200 may receive data from server 106 via network 108 (FIG. 1), and store the data in memory 260 as user data 260. In some embodiments, computing system 200 may create one or more user profiles including user preferences 250 and user data 260, and store the user profiles in memory 230, internal database 270, or external database one or more 280.

Figure 3:
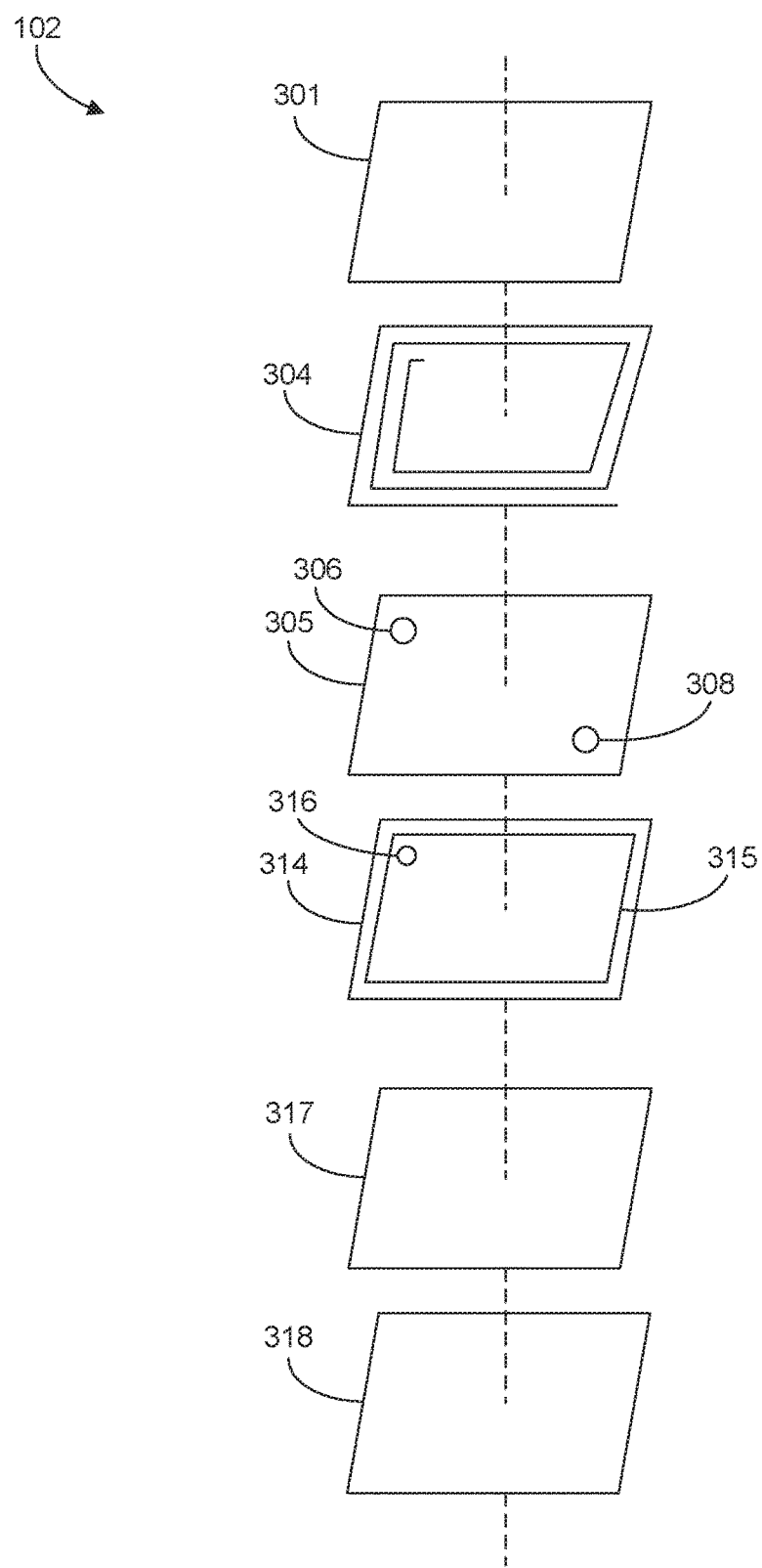
FIGS. 3-9 are exploded-view diagrams of the system of FIG. 1.

FIG. 3 is an exploded-view diagram of an exemplary user device 102. User device 102 may comprise a top protective component 301, an antenna 304, a vibration transducer 305, a circuit board such as a printed circuit board (PCB) 314, a metal plate 317, and a bottom protective component 318. Each of these components is discussed in detail below.

Protective components 301, 318 may be a coating or material to protect components within user device 102. Protective components 301, 318 may be a scratch-resistant coating or a material with a scratch-resistant chemical coating, such as ultra-violet curable chemical coating. The scratch-resistant material may comprise mineral glass, sapphire glass, PVC, PET, BOPET, polyvinylidene fluoride (e.g., Kynar), polyvinylidene difluoride, PC, PET-G, PMMA, ITO, ZnO, and/or thin-film alloys. Protective components 301, 318 may be plates, covers, or other rigid structures. In some embodiments, at least one of protective components 301, 318 may have an outwardly facing magnetic stripe (not shown) that may be read using a magnetic-stripe reader. The magnetic stripe may store data, such as alphanumeric characters and symbols, in tracks. Data on the tracks may be read, written, and rewritten. Processor 210 (FIG. 2) may route data to and from the tracks.

PCB 314 may contain and/or interconnect electronic components within user device 102 such as processor 210, I/O 230, and memory 230 (FIG. 2), as well as other electronic and electrical components such as LEDs and capacitors. PCB 314 may be a rigid PCB, a flexible PCB, or a combination of a rigid PCB and flexible PCB. One or more sides of PCB 314 may comprise an electrically conductive structure such as a power plane or a ground plane. The power or ground plane may be formed as internal layers of PCB 314.

FIG. 3 illustrates PCB 314 with a ground plane 315 on its top side. Ground plane 315 may be a layer of conductive material that serves as a return path for current from components in user device 102. Ground plane 315 may cover a large portion of the surface of PCB 314. PCB 314 may have a "via", that is, an opening, 316 in ground plane 315 to permit connection of a positive lead from antenna 304 to a signal trace on PCB 314. In some embodiments, additional vias may be used to permit connection of conductive paths on PCB 314 to antenna 304 and vibration transducer 305. Instead of in addition to PCB 314, user device 102 may comprise a solid-state circuit. The solid-state circuit may comprise a plurality of components, wherein at least one component may be coupled to vibration transducer 305 and the same or another component may be coupled to antenna 304.

Metal plate 317 may provide structural support (e.g., rigidity) to user device 102 or components therein. For example, metal plate 317 may provide support to PCB 314. Metal plate 317 may provide rigidity to prevent a user from accidentally breaking user device 102 by, for example, snapping it. Further, metal plate 317 may provide additional weight to user device 102 to enhance of quality and help users notice if user device 102 falls out of their pockets or is slipping out of their hands.

Antenna 304 may comprise a single antenna element, a multi-element array of antenna elements, or a plurality of separate antennas. Antenna 304 may be an NFC antenna, Bluetooth antenna, or other type of antenna, and may comprise an inductor. Antenna 304 may generate magnetic fields and/or emit electromagnetic waves to transmit data. The magnetic fields and/or electromagnetic waves may be received by an antenna in another device and transduced into an electrical signal that may be analyzed by components in the other device to process the transmitted data.

As illustrated in FIG. 3, antenna 304 may be placed in proximity to one or more internal conductive structures, such as ground plane 315 and metal plate 317. In some embodiments, conductive structures may be external to user device 102.

Magnetic fields generated by antenna 304 may reach ground plane 315 or other conductive structures internal or external to user device 102. When the generated magnetic field changes (e.g., when the transmitted signal is produced by a changing current to and/or voltage at antenna's 304 positive lead), magnetic flux through ground plane 315 changes and creates eddy currents in ground plane 315, as dictated by Faraday's Law of Induction. These eddy currents in turn may create a magnetic field that, under Lenz's Law, is in the opposite direction of the magnetic field generated by antenna 304. In this situation, the opposing magnetic field may interfere with the magnetic field from antenna 304 and inhibit the ability of antenna 304 to transmit a signal to a receiving device.

A similar issue is present when antenna 304 is receiving a magnetic field incident upon it. That is, eddy currents in ground plane 315 emit a magnetic field in the opposite direction and interfere with the incident magnetic field, preventing antenna 304 from receiving a desired signal without interference. Even if ground plane 315 does not create an interfering magnetic field (e.g., if there is no ground plane 315), another conductive structure may do so. For example, metal plate 317 may also create an interfering magnetic field when subjected to a changing magnetic field from antenna 304 or another device.

Another problem associated with placing antenna 304 near ground plane 315 or another conductive structure is a reduction of inductance of antenna 304. This reduction may cause the internal impedance of antenna 304 to drop and create a mismatch between its impedance and the output impedance of the circuit providing the signal to antenna 304, lowering the power outputted by antenna 304.

To prevent a loss of inductance and to decrease the magnitude of eddy currents and, consequently, an interfering magnetic field from ground plane 315 or another conductive structure, a ferromagnetic or other high-permeability material, such as a vibration transducer 305, may be placed between antenna 304 and ground plane 315 or the other conductive structure to shield the conductive structure from the magnetic fields. Vibration transducer 305 may be a monolithic film and may comprise a material with piezoelectric properties, such as polyvinylidene difluoride (PVDF) or a copolymer of PVDF.

In FIG. 3, vibration transducer 305 is positioned between antenna 304 and ground plane 315. Vibration transducer 305 is also positioned between antenna 304 and metal plate 317. Vibration transducer 305 may have one or more openings 306, 308 to permit connection of leads of antenna 304 to PCB 314.

Figure 4:
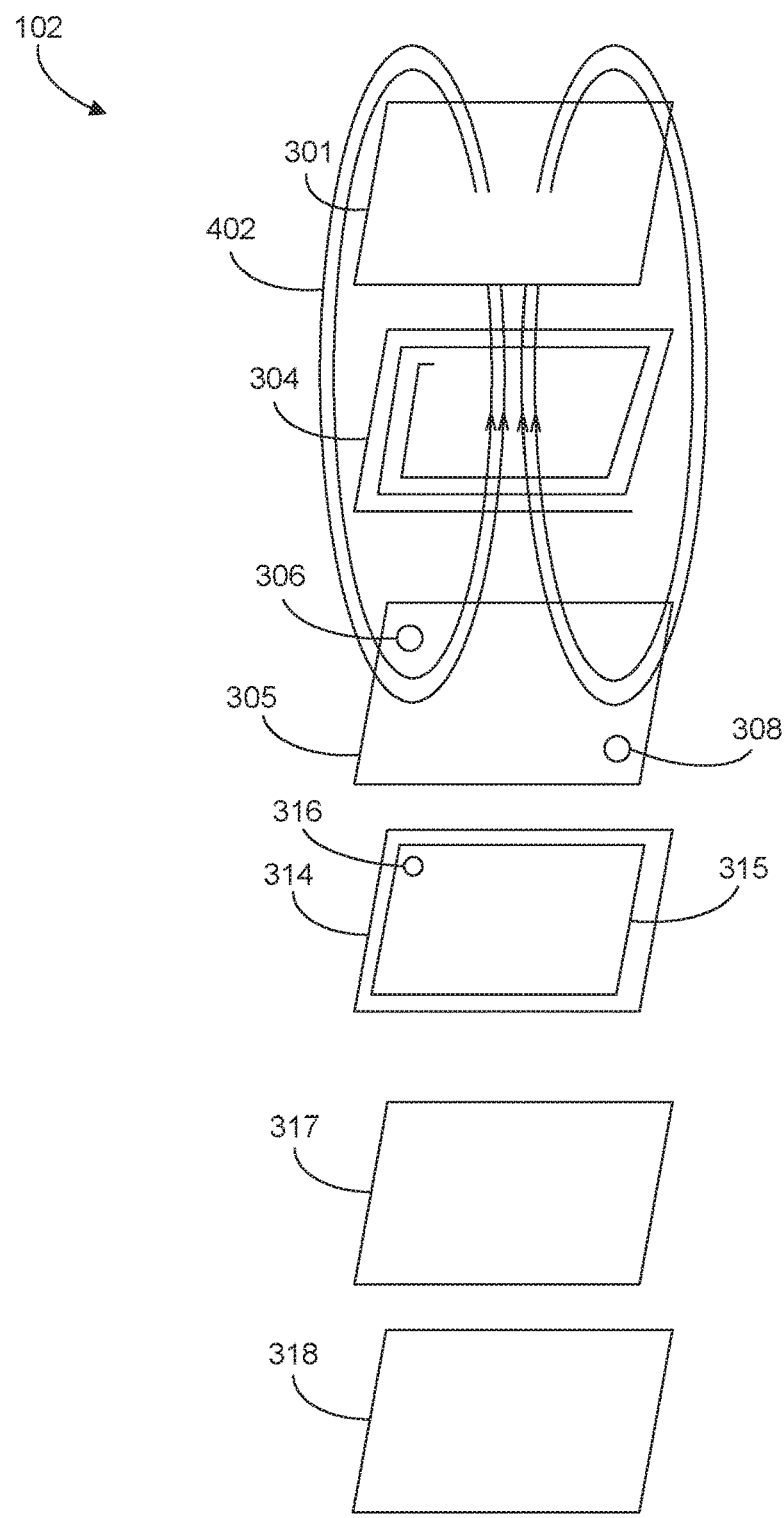

FIG. 4 is similar to FIG. 3, and shows a magnetic field 402 (illustrated as magnetic field lines) generated by antenna 304. Since vibration transducer 305 is positioned between antenna 304 and ground plane 315 as well as between antenna 304 and metal plate 317, vibration transducer 305 shields ground plane 315 and metal plate 317 from magnetic field 304, preventing generation of eddy currents in ground plane 315 and the resultant interfering magnetic fields.

Figure 5:
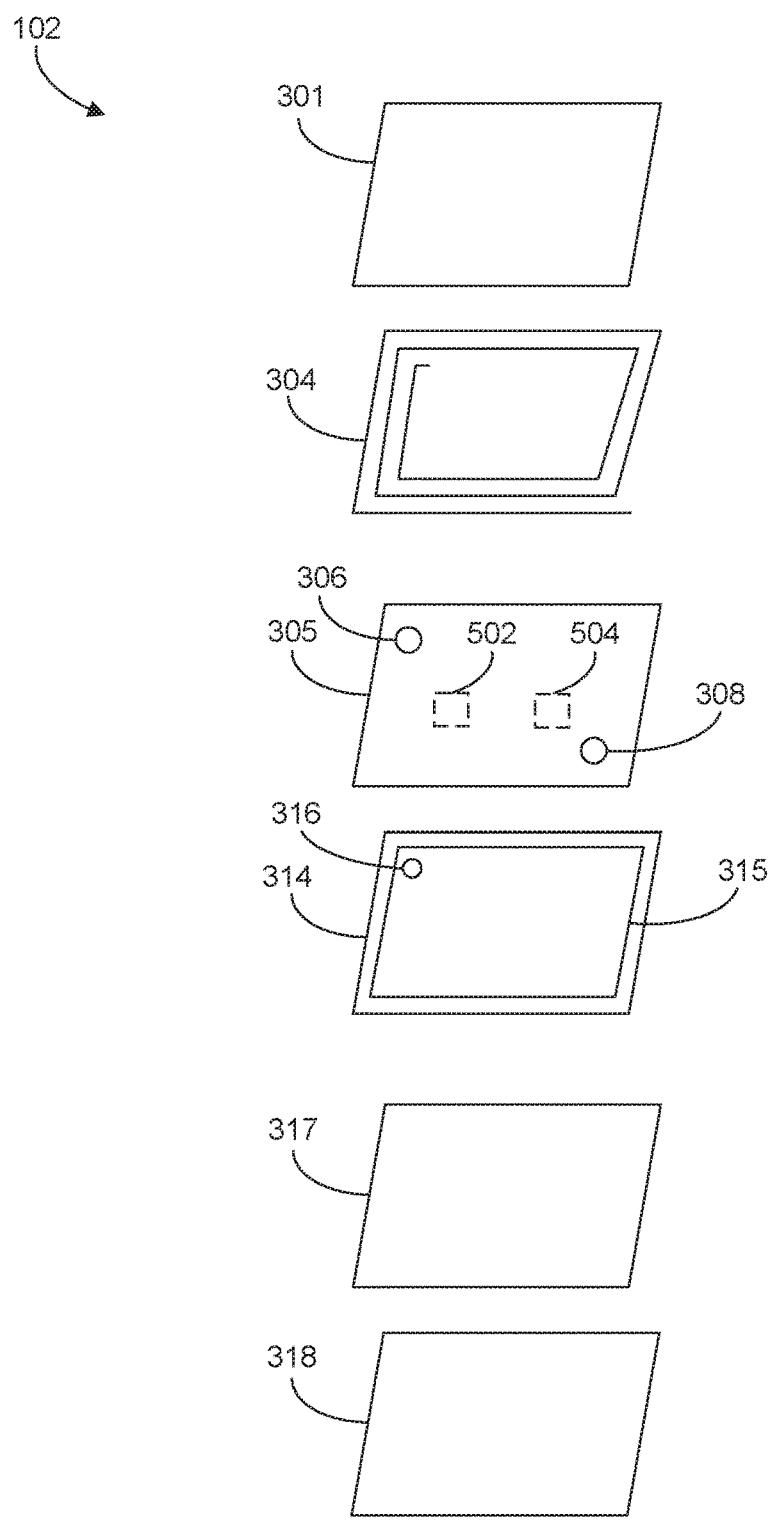

FIG. 5 is another exploded-view diagram of an exemplary user device 102. Vibration transducer 305 may comprise one or more electrically conductive electrodes 502, 504. Electrodes 502, 504 may be made of a metalized material that is neither piezoelectric nor ferromagnetic. In some embodiments, electrodes 502, 504 may be positioned on the bottom side of vibration transducer 305. In other embodiments, electrodes 502, 504 may be positioned on the top side of vibration transducer 305 instead or in addition to the bottom side. For example, electrode 502 may be on the bottom side of vibration transducer 305 and electrode 504 may be on the top side. One of electrodes 502 or 504 may be directly above or below the other electrode, or on another region of vibration transducer 305.

Electrodes 502 and 504 may be connected by a conducting material to signal traces or planes 315 on PCB 314. For example, electrode 502 may be connected to ground plane 315 and held at a substantially constant voltage (e.g., 0 V); that is, electrode 502 may be a constant-voltage electrode. Electrode 504 is connected to PCB 314 and receives electrical signals to establish an electric potential between electrodes 502, 504, and is designated a "hot" electrode. Since vibration transducer 305 is formed of piezoelectric material, the portion of vibration transducer 305 between electrodes 502, 504 is subjected to mechanical stress and deformed. This deformation may take the form of rapid rising and falling of the piezoelectric material between electrodes 502, 504, thus creating an oscillation or vibration. Such vibration may be used to provide a user with a haptic output notification. In some embodiments, vibration of piezoelectric material between electrodes 502, 504 may generate audible output signals, such that vibration transducer 305 functions as a speaker.

In some embodiments, a user may apply pressure to the region of vibration transducer 305 between electrodes 502, 504, thus generating an electrical signal that travels from electrode 504 to PCB 314. This signal may thus constitute a user-input signal to, for example, select a file or enable/disable user device 102. In some embodiments, the pressure may be provided by a finger press. In other embodiments, pressure may be provided as air pressure generated by, for example, a voice input, such that vibration transducer 305 functions as a microphone.

Figure 6:
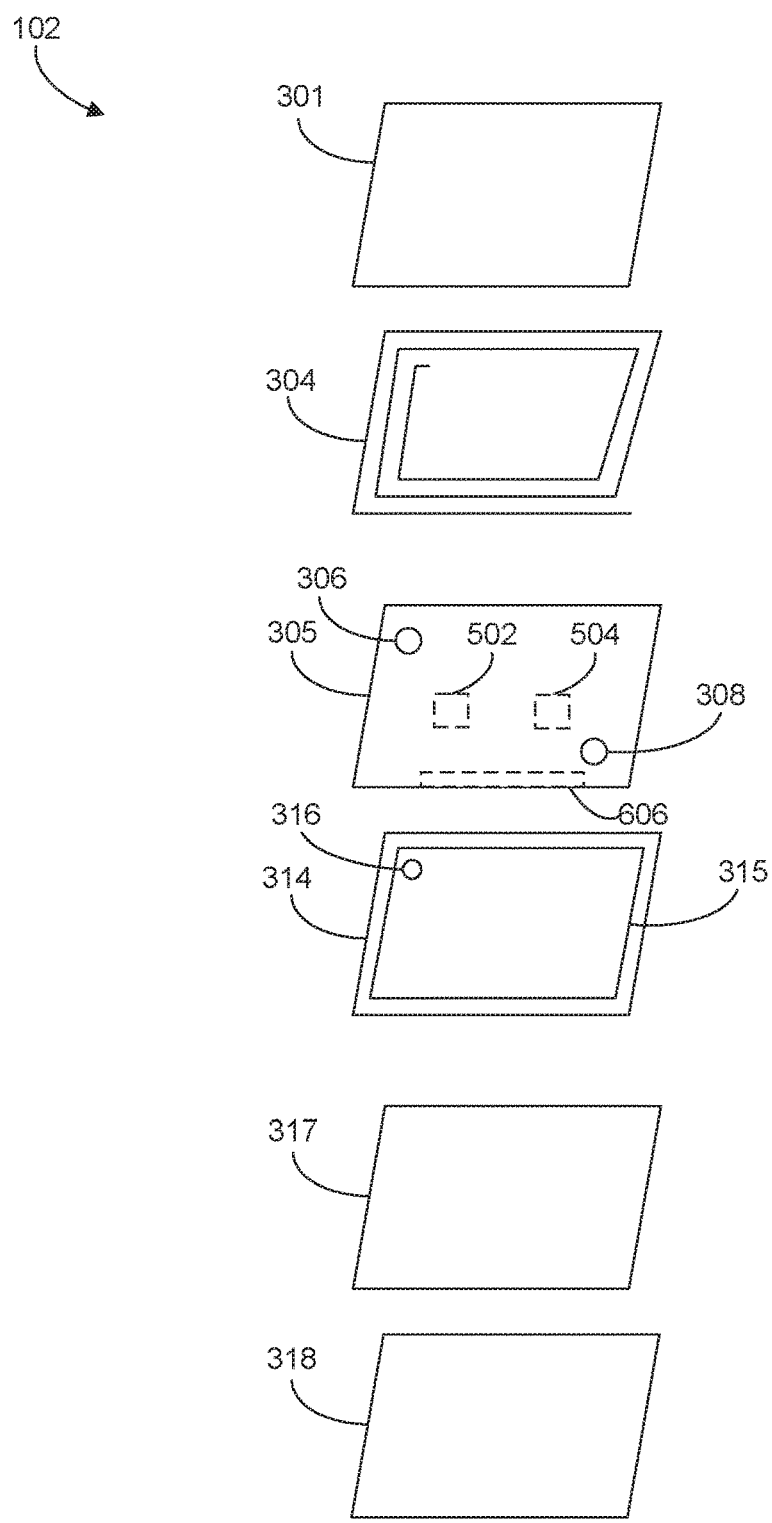

FIG. 6 is similar to FIGS. 3-5 and shows an electrode 606 configured as a constant-voltage electrode connected to ground plane 315. FIG. 6 also shows electrodes 502, 504 both configured as hot electrodes. In an embodiment, one of electrodes 502, 504 is configured to operate as only an input electrode and the other of electrodes 502, 504 configured as an output electrode.

In an embodiment, electrodes 502, 504, and 606 may be on one or more edges of vibration transducer 305, as illustrated in FIG. 6. The areas on vibration transducer 305 between electrodes 502 and 606 and/or electrodes 504 and 606 may vibrate (or provide other haptic outputs) and/or receive pressure input from the user. In an embodiment, instead or in addition to electrode 606 being connected to PCB 314 and held at a constant voltage (e.g., 0 V), there may be other electrodes connected to PCB 314 and held at a constant voltage (e.g., 0 V).

Figure 7:
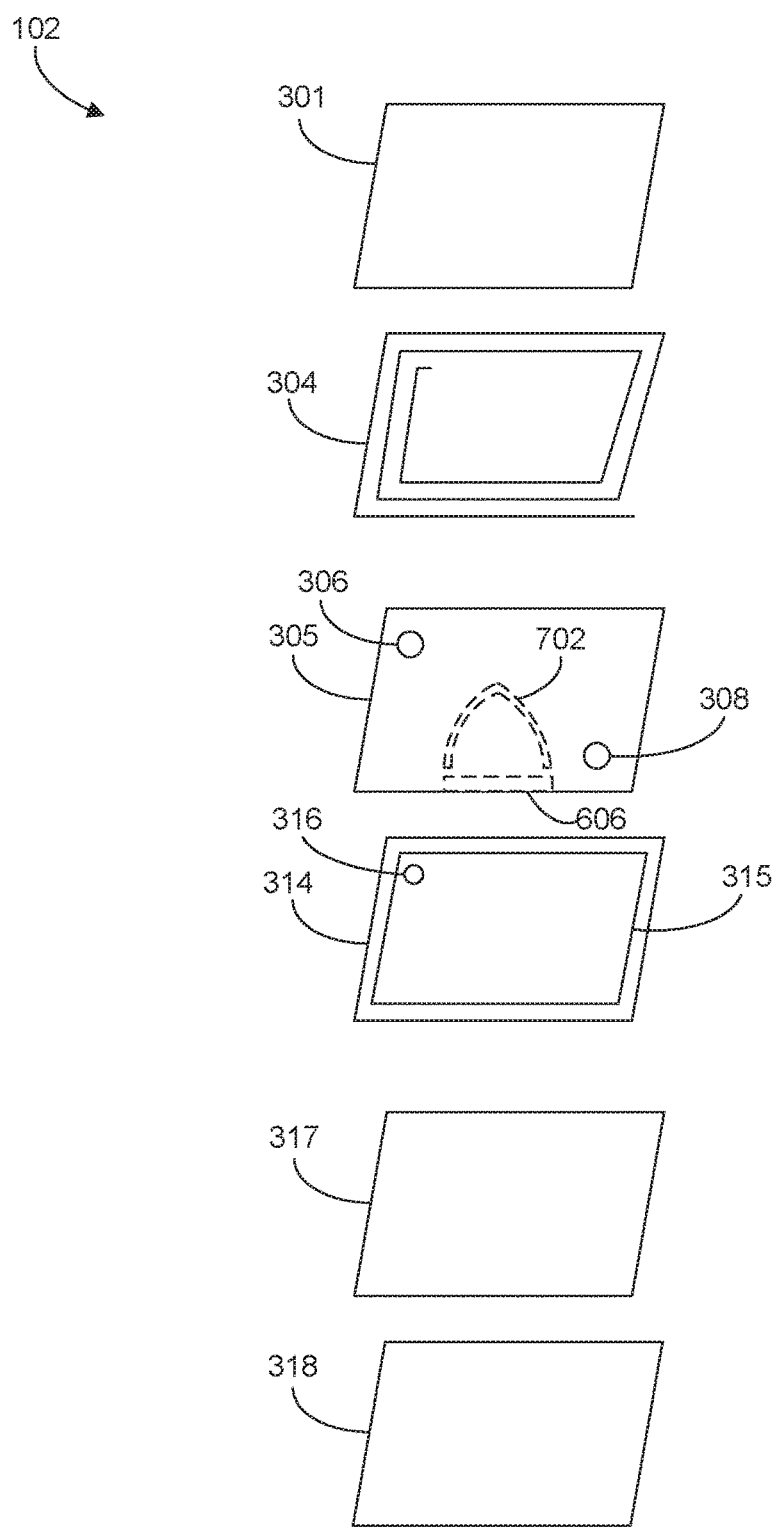

FIG. 7 is similar to FIGS. 3-6 and shows an electrode 702, configured in a shape to fulfill a design requirement (e.g., an industrial design requirement). Specifically, electrode 702 is shown in the approximate shape of a finger placed on top of user device 102, permitting a substantial portion of a user's finger to be detected by vibration transducer 305 when the finger is applying pressure to vibration transducer 305. Other electrode shapes and locations on vibration transducer 305 are contemplated. For example, electrodes may be placed in a manner that permits detection of whether a user is handling device 102 (e.g., on the edges of vibration transducer 305).

Figure 8:
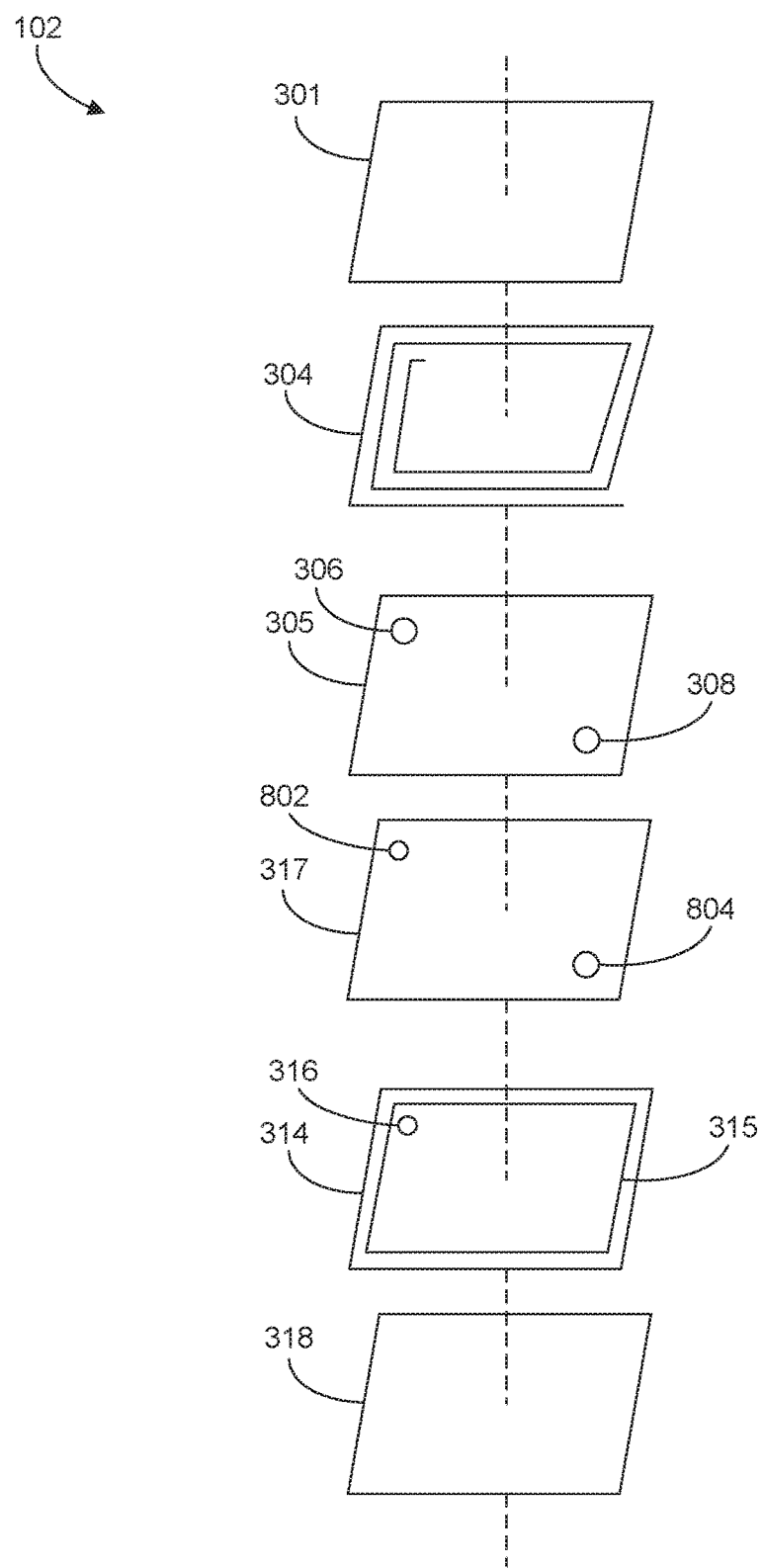

FIG. 8 is similar to FIGS. 3-7, showing metal plate 317 placed in a different position than illustrated in FIG. 3. For example, metal plate 317 may be positioned between vibration transducer 305 and PCB 314. Metal plate 317 may have openings 802, 804 through which to pass connections between the leads of antenna 304 and PCB 314.

Figure 9:
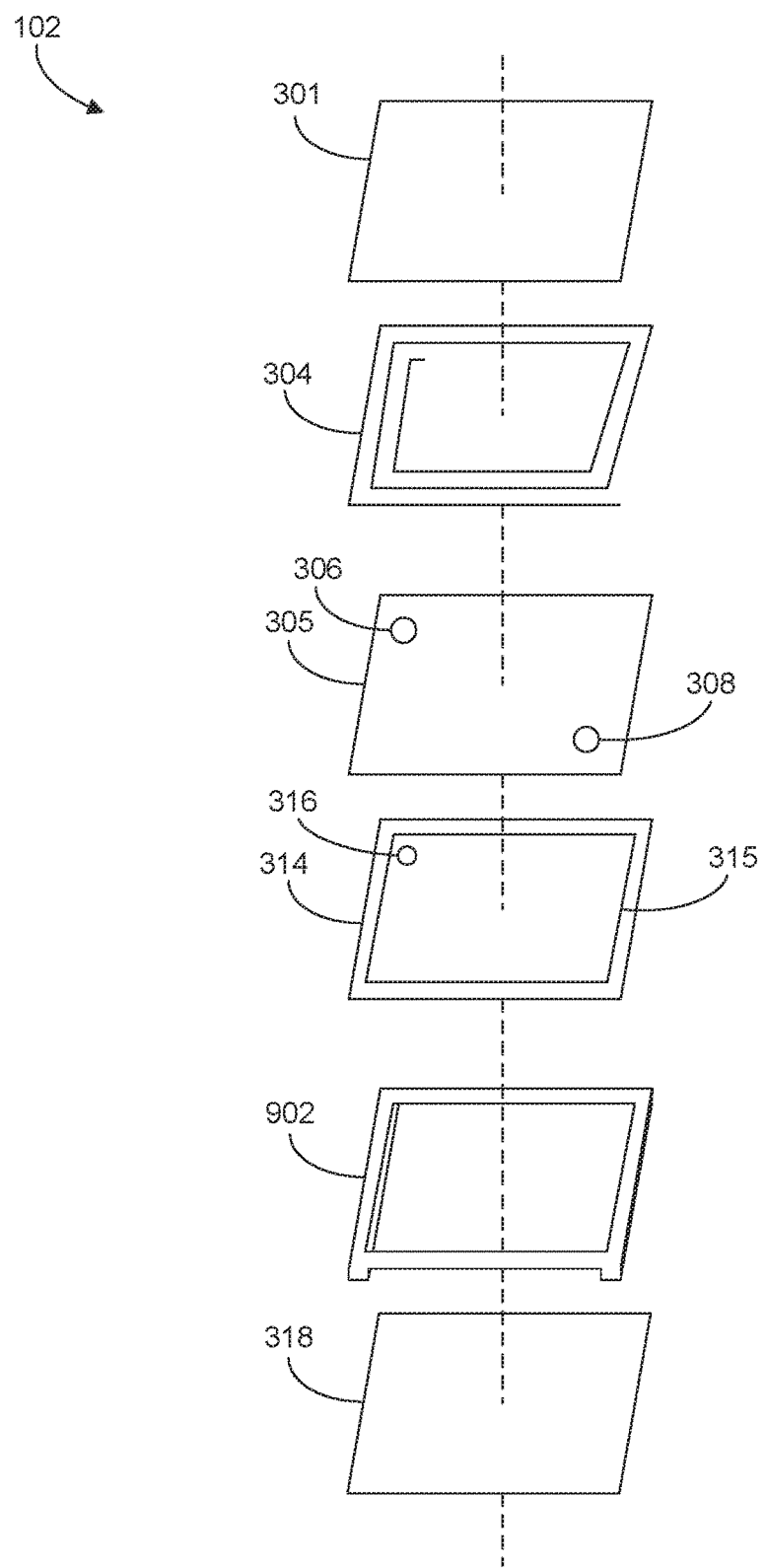

FIG. 9 is another exploded-view diagram of an exemplary user device 102. Instead of or in addition to metal plate 317, user device 102 may comprise a metal chassis 902. Metal chassis 902 may function as a frame or support structure (e.g., to provide rigidity). Metal chassis 902 may function as a mount for PCB 314. In some embodiments, user device 102 may comprise a non-metal chassis (not shown) instead or in addition to metal chassis 902.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure can be implemented as hardware alone.

Computer programs based on the written description and methods of this specification are within the skill of a software developer. The various programs or program modules can be created using a variety of programming techniques. For example, program sections or program modules can be designed in or by means of Java™ (see https://docs.oracle.com/javase/8/docs/technotes/guides/language/), C, C++, assembly language, or any such programming languages. One or more of such software sections or modules can be integrated into a computer system, non-transitory computer-readable media, or existing communications software.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application. These examples are to be construed as non-exclusive. Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

What is claimed is:

1. A system providing vibration transduction and radio-frequency communication in proximity to an electrically conductive structure, the system comprising:
   an antenna element;
   an electrically conductive structure in proximity to the antenna element; and
   a vibration transducer comprising a first material, the first material comprising a ferromagnetic material with piezoelectric properties, the vibration transducer being positioned between the antenna element and the conductive structure, and wherein the vibration transducer comprises a first portion comprising the first material and a second portion comprising a second material, the second material being other than a ferromagnetic material and being held at a constant voltage.

2. The system of claim 1, wherein the electrically conductive structure comprises a substantially flat surface.

3. The system of claim 1, wherein the electrically conductive structure comprises a metal plate.

4. The system of claim 1, wherein the electrically conductive structure comprises a metal chassis.

5. The system of claim 1, wherein the electrically conductive structure comprises a ground plane.

6. The system of claim 1, wherein the electrically conductive structure comprises a power plane.

7. The system of claim 1, wherein the ferromagnetic material comprises polyvinylidene difluoride (PVDF).

8. The system of claim 1, wherein the ferromagnetic material comprises a monolithic film.

9. The system of claim 1, further comprising an electrical circuit, the electrical circuit comprising a hot electrode coupled to a first portion of the vibration transducer and a constant-voltage electrode coupled to a second portion of the vibration transducer.

10. The system of claim 1, further comprising a circuit board, the circuit board comprising at least one conductive path coupled to the vibration transducer and at least one conductive path coupled to the antenna element.

11. The system of claim 1, further comprising an electronic circuit, wherein a first component of the circuit is coupled to the vibration transducer and a second component of the circuit is coupled to the antenna element.

12. The system of claim 1, wherein the vibration transducer converts mechanical stress into an electric signal.

13. The system of claim 1, wherein the vibration transducer deforms in response to an electrical signal.

14. The system of claim 1, wherein the vibration transducer generates a haptic output in response to an electrical signal.

15. The system of claim 1, wherein the vibration transducer generates an audible signal in response to an electrical signal.

16. The system of claim 1, wherein the antenna element comprises a Near-Field Communication antenna.

17. The system of claim 1, wherein the distance between the antenna element and the electrically conductive structure is less than 5 millimeters.

18. A system providing vibration transduction and radio-frequency communication in proximity to an electrically conductive structure, the system comprising:
- an antenna element comprising an inductor;
- an electrically conductive structure in proximity to the inductor; and
- a vibration transducer comprising a ferromagnetic material with piezoelectric properties, the vibration transducer being positioned adjacent to the inductor and between the inductor and the conductive structure, and wherein the vibration transducer comprises a first portion comprising a first material and a second portion comprising a second material, the second material being other than a ferromagnetic material and being held at a constant voltage.

19. A system providing vibration transduction and radio-frequency communication in proximity to an electrically conductive structure, the system comprising:
- an antenna element;
- an electrically conductive structure in proximity to the antenna element; and
- a vibration transducer comprising a ferromagnetic material with piezoelectric properties, wherein:
  - the vibration transducer is positioned between the antenna and the conductive structure,
  - the vibration transducer provides at least one of haptic or auditory output signals,
  - the vibration transducer converts at least one of a tactile or auditory input into an electrical signal, and
  - the vibration transducer comprises a first portion comprising a first material and a second portion comprising a second material, the second material being other than a ferromagnetic material and being held at a constant voltage.

* * * * *